(12) United States Patent
Nishimoto et al.

(10) Patent No.: US 9,417,095 B2
(45) Date of Patent: Aug. 16, 2016

(54) ROTARY POSITION DETECTION DEVICE

(71) Applicant: DENSO CORPORATION, Kariya, Aichi-pref. (JP)

(72) Inventors: Seiji Nishimoto, Kariya (JP); Yoshiyuki Kono, Obu (JP); Ninh Duc Hoang, Nagoya (JP)

(73) Assignee: DENSO CORPORATION, Kariya (JP)

( * ) Notice: Subject to any disclaimer, the term of this patent is extended or adjusted under 35 U.S.C. 154(b) by 163 days.

(21) Appl. No.: 14/263,230

(22) Filed: Apr. 28, 2014

(65) Prior Publication Data
US 2014/0333297 A1 Nov. 13, 2014

(30) Foreign Application Priority Data

May 10, 2013 (JP) .................................. 2013-100356

(51) Int. Cl.
| | |
|---|---|
| *G01B 7/14* | (2006.01) |
| *G01B 7/30* | (2006.01) |
| *G01D 5/12* | (2006.01) |
| *G01D 5/14* | (2006.01) |

(Continued)

(52) U.S. Cl.
CPC .................. *G01D 5/12* (2013.01); *G01D 5/142* (2013.01); *G01D 5/145* (2013.01); *G01D 5/2033* (2013.01); *G01D 5/2241* (2013.01); *G04C 5/00* (2013.01); *H02K 49/102* (2013.01)

(58) Field of Classification Search
CPC ....... G01D 5/145; G01D 11/245; G01D 5/12; G01D 5/142; G01D 5/2033; G01D 5/2241; G04C 5/00; H02K 49/102
USPC ........ 324/207.25, 51, 55, 200, 207.2, 207.11, 324/207.21
See application file for complete search history.

(56) References Cited

U.S. PATENT DOCUMENTS

| | | | | |
|---|---|---|---|---|
| 2002/0117914 A1* | 8/2002 | Doi | ........................ | H02K 5/161 |
| | | | | 310/68 R |
| 2007/0103149 A1* | 5/2007 | Horie | ..................... | G01D 5/145 |
| | | | | 324/207.25 |

(Continued)

FOREIGN PATENT DOCUMENTS

| | | |
|---|---|---|
| JP | H10-197209 A | 7/1998 |
| JP | 2004-233280 A | 8/2004 |
| JP | 2014-059207 A | 2/2014 |

OTHER PUBLICATIONS

Office Action issued May 7, 2015 in corresponding JP Application No. 2013-100356 (with English translation).

(Continued)

*Primary Examiner* — Huy Q Phan
*Assistant Examiner* — Raul Rios Russo

(57) ABSTRACT

A magnetic flux emission unit is mounted on a detection object and rotatable integrally with the detection object. An IC package includes a magnetism detection element, which sends a signal according to change in a magnetic flux caused when the magnetic flux emission unit rotates. A cover member includes a bottom portion and a tubular portion. The tubular portion is extended from an outer periphery of the bottom portion. The cover member surrounds the magnetic flux emission unit with the bottom portion when mounted to the housing. A support portion is projected from the bottom portion toward an opening of the tubular portion to support the IC package. A projection is projected toward the opening from the bottom portion to at least a position corresponding to the magnetism detection element.

17 Claims, 4 Drawing Sheets

(51) Int. Cl.
G01D 5/20 (2006.01)
G01D 5/22 (2006.01)
G01R 33/06 (2006.01)
H01L 43/08 (2006.01)
H01L 43/06 (2006.01)
G04C 5/00 (2006.01)
H02K 49/10 (2006.01)

(56) References Cited

U.S. PATENT DOCUMENTS

| | | | | |
|---|---|---|---|---|
| 2007/0145838 A1* | 6/2007 | Uchitani | ............... | H02K 3/522 |
| | | | | 310/68 B |
| 2008/0019850 A1* | 1/2008 | Tajima | ............... | H02K 5/12 |
| | | | | 417/410.1 |
| 2008/0061769 A1* | 3/2008 | Junk | ............... | F16K 37/0033 |
| | | | | 324/207.22 |
| 2008/0079423 A1* | 4/2008 | Wolf | ............... | G01D 5/145 |
| | | | | 324/207.25 |
| 2008/0121831 A1* | 5/2008 | Ikeda | ............... | F02D 9/105 |
| | | | | 251/129.11 |
| 2009/0146648 A1* | 6/2009 | Iwahashi | ............... | G01P 1/04 |
| | | | | 324/207.25 |
| 2010/0056030 A1* | 3/2010 | Tomita | ............... | B24B 37/04 |
| | | | | 451/443 |
| 2010/0262347 A1* | 10/2010 | Murota | ............... | B60K 23/04 |
| | | | | 701/69 |
| 2011/0094474 A1* | 4/2011 | Ikeda | ............... | F02D 9/105 |
| | | | | 123/403 |
| 2012/0062218 A1* | 3/2012 | Hiramoto | ............... | G01D 11/245 |
| | | | | 324/207.25 |
| 2012/0169325 A1* | 7/2012 | Iwahashi | ............... | G01D 11/245 |
| | | | | 324/207.25 |
| 2012/0319514 A1* | 12/2012 | Iwase | ............... | B60K 6/40 |
| | | | | 310/78 |
| 2013/0162246 A1* | 6/2013 | Nakajima | ............... | G01R 33/09 |
| | | | | 324/252 |
| 2014/0077794 A1 | 3/2014 | Takiguchi et al. | | |

OTHER PUBLICATIONS

Office Action issued Jun. 30, 2015 in corresponding KR Application No. 10-2014-0054857.

* cited by examiner

ROTARY POSITION DETECTION DEVICE

CROSS REFERENCE TO RELATED APPLICATION

This application is based on reference Japanese Patent Application No. 2013-100356 filed on May 10, 2013, the disclosure of which is incorporated herein by reference.

TECHNICAL FIELD

The present disclosure relates to a rotary position detection device configured to detect a rotary position of a detection object.

BACKGROUND

Conventionally, a known rotary position detection device has a configuration having a support portion, which supports an IC package including a magnetism detection element. For example, Patent Document 1 discloses a rotary position detection device including a support portion and a dish-shaped cover member. The support portion has a tip end, which supports an IC package. The support portion is projected from a bottom portion of the cover member toward an opening of the cover member.

[Patent document 1]
Publication of unexamined Japanese Patent Application No. 2012-063202

In the configuration of Patent Document 1, the housing supports a detection object rotatably. In the configuration of Patent Document 1, when, for example, the cover member is mounted to the housing to construct the rotary position detection device, the IC package may make contact with an opposed component such as the housing, the detection object, and/or a magnetic flux emission unit mounted on the detection object. Consequently, the IC package may be broken due to contact with an opposed component.

Furthermore, an assumed configuration may include a support portion, which supports an IC package, such that an IC package is at least partially located on the opposite side of an opening of a cover member from a bottom portion of the cover member. In the present assumed configuration, the cover member may be placed on a desk or the like such that the opening of the cover member is turned down, when, for example, the cover member is stored or manufactured. In such a state, the IC package may be damaged due to making contact with an upper surface of the desk. Alternatively or in addition, the IC package may be damaged due to making contact with another component when, for example, the cover member conveyed.

SUMMARY

It is an object of the present disclosure to produce a rotary position detection device configured to protect an IC package from breakage.

According to an aspect of the present disclosure, a rotary position detection device is configured to detect a rotary position of a detection object. The detection object is rotatably supported by a housing. The rotary position detection device comprises a magnetic flux emission unit mounted on the detection object and configured to rotate integrally with the detection object. The rotary position detection device further comprises an IC package including a magnetism detection element. The magnetism detection element is configured to send a signal according to change in a direction of a magnetic flux, which is caused when the magnetic flux emission unit rotates. The rotary position detection device further comprises a cover member including a bottom portion and a tubular portion. The tubular portion is in a tubular shape and extended from an outer periphery of the bottom portion. The cover member is configured to be mounted to the housing to surround the magnetic flux emission unit with the bottom portion on a side of the tubular portion. The rotary position detection device further comprises a support portion projected from the bottom portion in a direction toward an opening of the tubular portion. The support portion is configured to support the IC package and to enable the magnetism detection element to send the signal. The rotary position detection device further comprises a projection formed separately from the support portion. The projection is projected in a direction toward the opening. The projection is projected from a portion of the bottom portion around the support portion to at least a position, which corresponds to the magnetism detection element.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, a rotary position detection device according to multiple embodiments of the present disclosure will be described with reference to drawings.

(First embodiment)

FIGS. 1 to 4 show a rotary position detection device according to a first embodiment of the present disclosure and show a part of the rotary position detection device.

A rotary position detection device 1 is employed, for example, to compute a position of a throttle valve 2, which is equipped to a vehicle. The rotary position detection device 1 detects, as a detection object, a rotary position of a valve shaft 4 of the throttle valve 2. The present configuration enables computation of the position (opening position) of the throttle valve 2.

Figure 1:
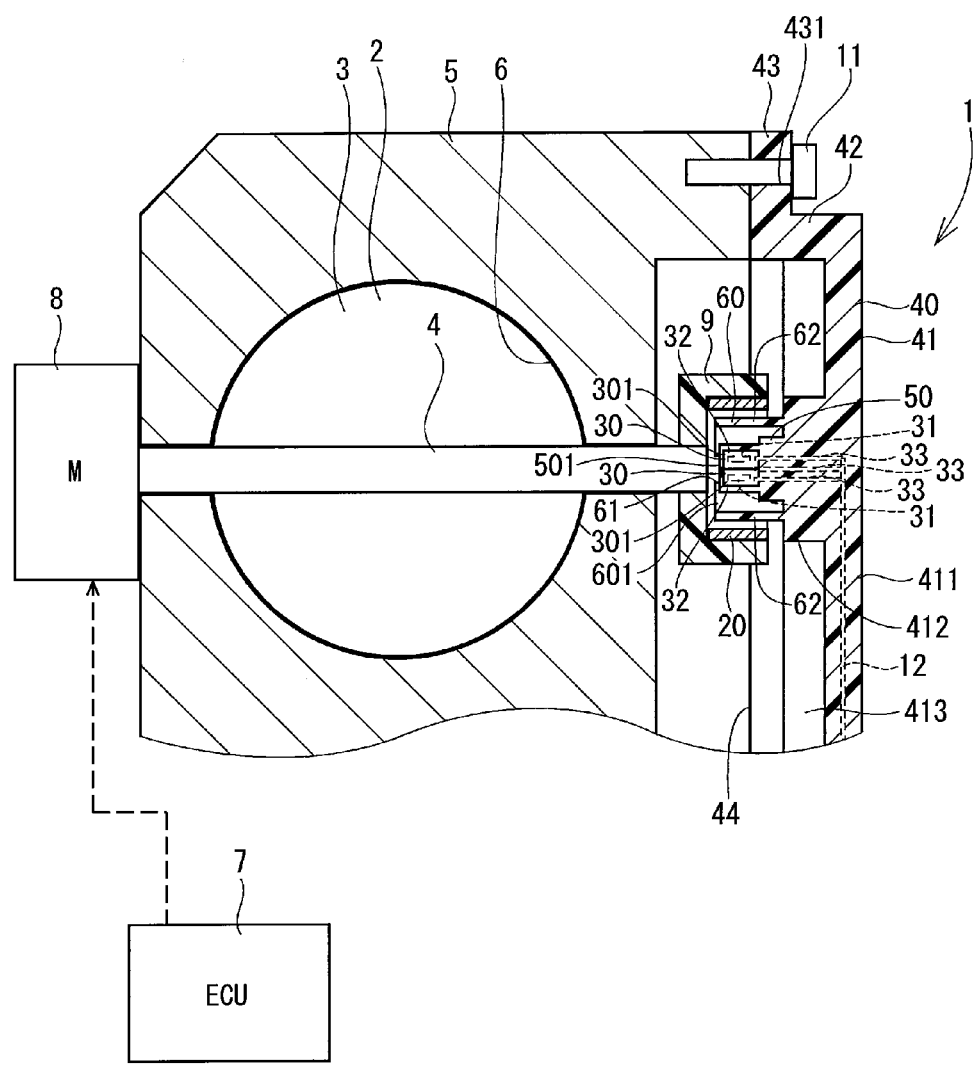
FIG. 1 is a schematic sectional view showing a rotary position detection device according to a first embodiment of the present disclosure.

As shown in FIG. 1, the throttle valve 2 includes a plate portion 3 and the valve shaft 4. The plate portion 3 is substantially in a circular plate shape and equipped to an intake passage 6, which is formed in a housing 5. The valve shaft 4 is in a bar shape and is integrated with the plate portion 3 such that the valve shaft 4 extends through a center of the plate portion 3 in a direction along a plate surface of the plate portion 3. The plate portion 3 of the throttle valve 2 has both sides, which are rotatably supported by bearings of the housing 5. The housing 5 forms the intake passage 6. The intake passage 6 is formed to extend in a direction perpendicular to a paper plane of FIG. 1. The valve shaft 4 is equipped to extend in a direction substantially perpendicular to a flow direction of intake air. Furthermore, both ends of the valve shaft 4 are projected from the housing 5.

In the present configuration, the valve shaft 4 is supported by the bearings of the housing 5. Therefore, the throttle valve 2 is rotatable together with the valve shaft 4 in the intake passage 6. That is, the housing 5 rotatably supports the throttle valve 2 as a detection object. In the present configuration, the throttle valve 2 is rotatable to open and close the intake passage 6.

The vehicle is equipped with an electronic control unit (ECU) 7. The ECU 7 is a small-sized computer equipped with a computation unit, a storing unit, an input-output unit, and/or the like. The ECU 7 is configured to execute a program, which is stored in the storing unit, to implement computation according to signals from various sensors, which are equipped to the vehicle. Thus, the ECU 7 controls operations of equipments and devices of the vehicle. In this way, the ECU 7 controls the vehicle comprehensively.

One end of the valve shaft 4 is equipped with a motor 8. The ECU 7 controls the motor 8 to rotate the valve shaft 4. The ECU 7 controls rotation of the motor 8 thereby to control the position of the throttle valve 2 and to control an amount of intake air supplied to an internal combustion engine (not shown).

The other end of the valve shaft 4 is equipped with a holder 9. The holder 9 includes a tubular portion and a bottom portion. The tubular portion is substantially in a tubular shape. The bottom portion covers one end of the tubular portion. That is, the holder 9 is in a bottomed tubular shape. The holder 9 is fixed to the valve shaft 4 at the center of the bottom portion thereby mounted to the valve shaft 4. With the present configuration, the holder 9 is rotatable integrally with the valve shaft 4.

The rotary position detection device 1 includes a magnet 20, an IC package 30, a cover member 40, a support portion 50, a projection 60, and the like. The magnet 20 may function as a magnetic flux emission unit. The magnet 20 is affixed to an inner wall of the tubular portion of the holder 9. The magnet 20 is, for example, a bond magnet (plastic magnet). The magnet 20 has N poles and S poles arranged alternately in a circumferential direction of the tubular portion of the holder 9. In the present configuration, as the valve shaft 4 rotates, the direction of the magnetic flux changes inside the tubular portion of the holder 9. The magnet 20 is equipped to the throttle valve 2 such that the magnet 20 is rotatable integrally with the throttle valve 2 and such that the magnet 20 is formed or equipped substantially in a tubular shape inside the holder 9 in this way.

The IC package 30 includes magnetism detection elements 31, an encapsulation material 32, a lead 33, and the like. The magnetism detection elements 31 are semiconductor devices, such as hall elements. The magnetism detection elements 31 each sends a signal in accordance with a vertical component of a magnetic flux passing therethrough. That is, the magnetism detection element 31 sends a signal in accordance with change in the direction of the magnetic flux passing therethrough.

The encapsulation material 32 is formed of resin such that the encapsulation material 32 surrounds the magnetism detection element 31. The encapsulation material 32 is, for example, in a rectangular plate shape. The magnetism detection element 31 has a magnetism sensing surface, which is substantially in parallel with a surface direction of the encapsulation material 32. The encapsulation material 32 may function to protect the magnetism detection element 31 from application of impact, humidity, heat, and/or the like caused by an external object. The lead 33 is formed of a metallic material such as copper to be, for example, in a bar shape. The lead 33 is electrically connected with the magnetism detection element 31 at one end. The lead 33 is exposed from the encapsulation material 32 at the other end. In the present embodiment, as shown in FIG. 1, two components of the IC package 30 are equipped. The two IC packages 30 are located such that the encapsulation materials 32 overlap one another in a thickness direction.

Figure 2:
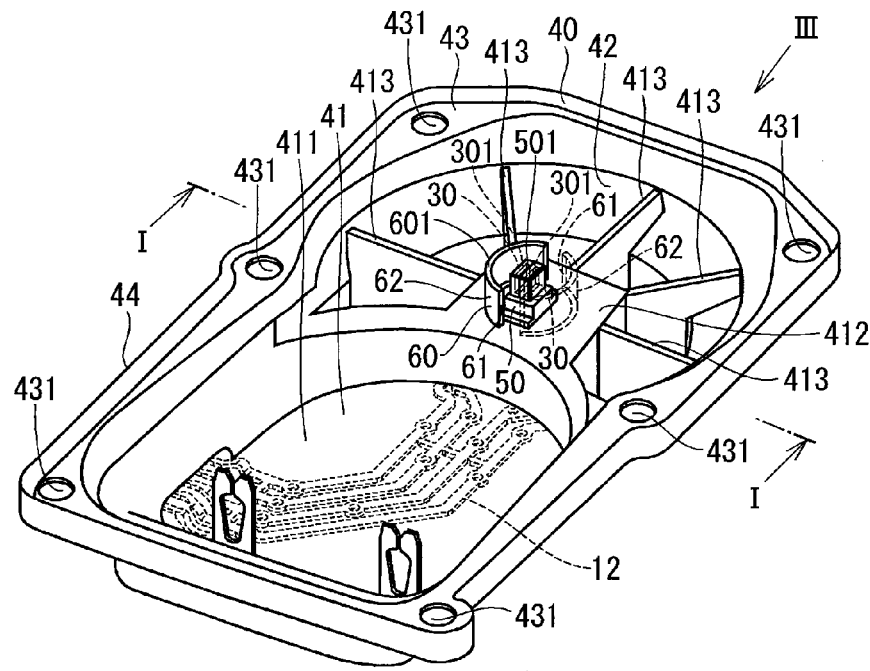
FIG. 2 is a perspective view showing the rotary position detection device according to the first embodiment.

As shown in FIG. 2, the cover member 40 is formed of, for example, resin. The cover member 40 is formed in a bottomed tubular shape. More specifically, the cover member 40 may be formed in a dish shape. The cover member 40 includes a bottom portion 41, a tubular portion 42, a flange portion 43, and the like. The bottom portion 41 includes a plate portion 411, a base portion 412, ribs 413, and the like. The plate portion 411 is formed in a substantially rectangle plate shape. The base portion 412 is integrally formed with the plate portion 411. The base portion 412 is in a block shape and is projected from one side of the plate portion 411 in a thickness direction. The ribs 413 include multiple elements. The ribs 413 are radially extended from the base portion 412. Each of the ribs 413 has a surface perpendicular to the plate portion 411. The ribs 413 are integrally formed with the plate portion 411 and the base portion 412, such that radially outer ends of the ribs 413 are partially connected with the plate portion 411 and the base portion 412.

A wiring 12 is insert-molded with the bottom portion 41. The wiring 12 is formed of, for example, a metallic material, such as copper. One end of the wiring 12 is electrically connected with the lead 33 of the IC package 30. The other end of the wiring 12 is electrically connected with the ECU 7. In the present configuration, the magnetism detection element 31 of the IC package 30 sends a signal through the wiring 12 to the ECU 7.

The tubular portion 42 is in a tubular shape and is integrally formed with the bottom portion 41. The tubular portion 42 extends from an outer periphery of the plate portion 411 of the bottom portion 41 in a direction same as a direction in which the base portion 412 is projected. In the present configuration, the base portion 412 is surrounded by the tubular portion 42. The ribs 413 are connected with an inner wall of the tubular portion 42. The present configuration enhances mechanical strength of the plate portion 411 and the tubular portion 42. Referring to FIG. 1, the tubular portion 42 has an opening 44 on the opposite side of the bottom portion 41. Referring back to FIG. 2, the flange portion 43 extends from an end of the tubular portion 42 on the opposite of the bottom portion 41. The flange portion 43 extends outward from the end of the tubular portion 42 in an annular form. The cover member 40 has multiple holes 431 each extending through the flange portion 43 in a thickness direction.

The cover member 40 is mounted to the housing 5 by, for example, screwing fastening members, such as screws 11, through the holes 431 into the housing 5. The cover member 40 is mounted to the housing 5 such that the cover member 40 surrounds the magnet 20 at the side of the base portion 412 of the bottom portion 41. That is, the cover member 40 surrounds the magnet 20 at the side of the tubular portion 42. Referring to FIG. 1, the cover member 40 is formed such that the base portion 412 is located at a position corresponding to the positions of the magnet 20 and the holder 9 when the cover member 40 is mounted to the housing 5.

The support portion 50 is formed of, for example, resin. The support portion 50 is formed integrally with the base portion 412 of the bottom portion 41. The support portion 50 is projected from the base portion 412 of the bottom portion 41 toward the opening 44. That is, the support portion 50 is projected from the base portion 412 to the opposite side of the plate portion 411. In the present configuration, the support portion 50 is projected from the base portion 412 of the bottom portion 41 toward the magnet 20 when the cover member 40 is mounted to the housing 5. The support portion 50 has an end on the opposite side of the base portion 412, and the end of the support portion 50 is configured to be located inside the tubular portion of the holder 9. That is, the end of the support portion 50 is configured to be located inside the magnet 20.

In the present embodiment, referring to FIG. 1, two IC packages 30 are insert-molded such that the encapsulation materials 32 are located inside an end 501 of the support portion 50. The end 501 of the support portion 50 located on the opposite side of the base portion 412. That is, the encapsulation material 32 of the IC package 30 is surrounded by the end 501 of the support portion 50. In the present configuration, the IC package 30 (magnetism detection element 31) is located inside the magnet 20 in the state where the cover member 40 is mounted to the housing 5. It is noted that, the support portion 50 supports the IC package 30 such that the thickness direction of the encapsulation material 32 substantially coincides with the radial direction of the magnet 20, which is substantially in a tubular shape.

Figure 3:
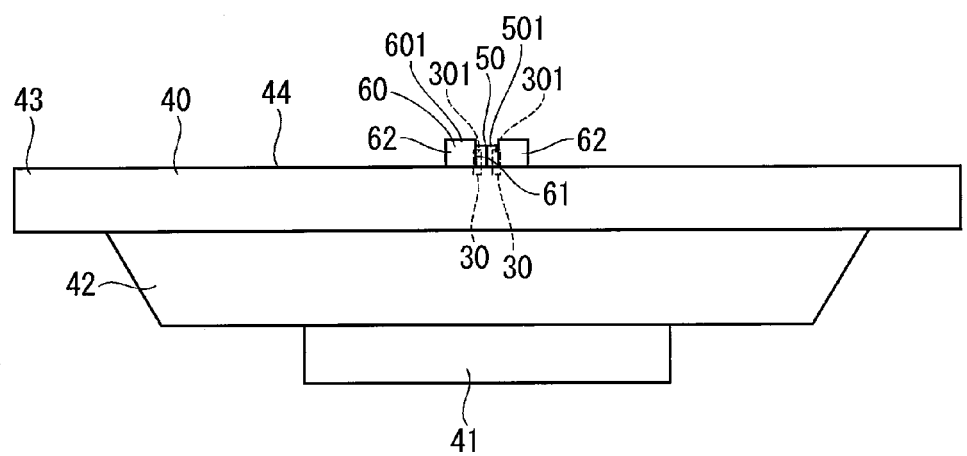
FIG. 3 is a lateral view when viewed along an arrow III in FIG. 2.

As shown in FIG. 3, according to the present embodiment, the support portion 50 is formed to have a tip end, which is the end 501 on the opposite side of the base portion 412. In addition, the end 501 is located on the opposed side of the opening 44 of the cover member 40 from the bottom portion 41. Therefore, the IC package 30 is located at least partially on the opposite side of the opening 44 from the bottom portion 41.

In the present configuration, when the magnet 20 rotates together with the valve shaft 4 of the throttle valve 2, a vertical component of the magnetic flux, which passes through the magnetism detection element 31 of the IC package 30, changes. Therefore, the magnetism detection element 31 sends a signal according to change in the direction of the magnetic flux. The signal is transmitted to the ECU 7 through the lead 33 and the wiring 12. According to the present configuration, the ECU 7 is enabled to compute the rotary position and the opening position of the throttle valve 2 with reference to the signal from the magnetism detection element 31.

The projection 60 is formed of, for example, resin, integrally with the base portion 412 of the bottom portion 41. The projection 60 is projected from a portion of the base portion 412, which is close to the support portion 50. The projection 60 is projected in a direction same as the direction in which the support portion 50 is projected. The projection 60 is formed substantially in a tubular shape to surround the support portion 50. The projection 60 is formed separately from the support portion 50.

Figure 4:
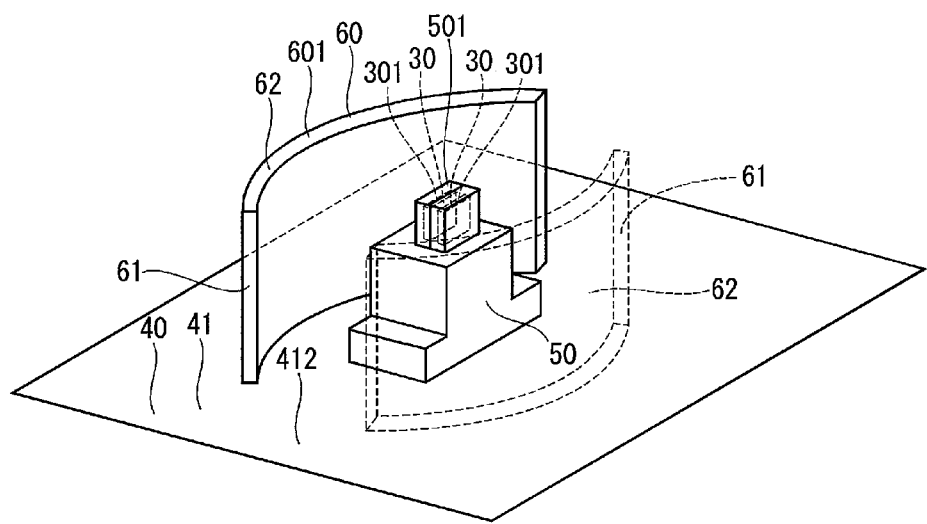
FIG. 4 is a perspective view showing an IC package of the rotary position detection device according to the first embodiment and a portion around the IC package.

As shown in FIGS. 1, 3, and 4, according to the present embodiment, the projection 60 has an end (projection end) 601 on the opposite side of the bottom portion 41. The IC package 30 has an end (IC package end) 301 on the opposite side of the bottom portion 41. The end 601 of the projection 60 is located on the opposite side of the end 301 of the IC package 30 from the bottom portion 41. Specifically, the projection 60 is projected from the portion of the bottom portion 41, which is close to the support portion 50, toward the opening 44. The projection 60 is projected at least to a position, which corresponds to the magnetism detection element 31. In particular, according to the present embodiment, the end 601 of the projection 60 is located on the opposite side of the end 501 of the support portion 50 from the bottom portion 41.

As shown in FIG. 4, according to the present embodiment, the projection 60 has notch portions 61. Each of the notch portions 61 is formed by cutting the projection 60 partially in the circumferential direction. In the present embodiment, two notch portions 61 are formed at a regular interval in the circumferential direction of the projection 60. In addition, the two notch portions 61 form two wall portions 62 therebetween. Each of the two wall portions 62 has a cross-section, which is in an arc shape. In the present embodiment, the two notch portions 61 and the two wall portions 62 are point-symmetrically located to each other relative to the axis of the projection 60. As shown in FIG. 1, according to the present embodiment, the projection 60 is formed to be located inside the tubular magnet 20 in the state where the cover member 40 is mounted to the housing 5.

As described above, according to the present embodiment, the projection 60 is formed to be partially located close to the IC package 30. Therefore, instead of the IC package 30 (end 501), the projection 60 is enabled to make contact with the opposed component such as the housing 5, the throttle valve 2, the holder 9, the magnet 20, and/or the like, when, for example, the cover member 40 is mounted to the housing 5. Thus, the IC package 30 (end 501) is protected from making contact with an opposed component. The present configuration enables to protect the IC package 30 (end 501) from breakage due to making contact with the opposed component.

According to the present embodiment, the IC package 30 is supported by the support portion 50, such that the IC package 30 is at least partially located on the opposite side of the opening 44 of the tubular portion 42 from the bottom portion 41. When the device is, for example, stored or manufactured, the cover member 40 may be placed on a desk or the like while the opening 44 is turned down. The configuration according to the present embodiment may enable effectively to protect the IC package 30 (end 501) from breakage caused by making contact with an upper surface of the desk. In addition, the configuration according to the present embodiment may enable effectively to protect the IC package 30 (end 501) from breakage caused by making contact with another component or equipment when, for example, the device is conveyed.

In addition, according to the present embodiment, the projection 60 has the end 601 on the opposite side of the bottom portion 41. The IC package 30 has the end 301 on the opposite side of the bottom portion 41. The end 601 of the projection 60 is located on the opposite side of the end 301 of the IC package 30 from the bottom portion 41. Therefore, the present configuration may enable further effectively to protect the IC package 30 (end 501) from breakage caused by making contact with another component or equipment. According to the present embodiment, the projection 60 is formed substantially in a tubular shape to surround the support portion 50. The present configuration enables to restrict the IC package 30 (end 501) from making contact with another component in various directions.

According to the present embodiment, the projection 60 has multiple notch portions 61 in the circumferential direction. Each of the notch portions 61 is formed by cutting the projection 60 partially in the circumferential direction. The present configuration enables to reduce a material, such as resin, used to form the projection 60. Therefore, a manufacturing cost for the device can be reduced.

According to the present embodiment, the magnet 20 is formed in a tubular shape, or the magnet 20 is arranged in a tubular form. In addition, the projection 60 is formed to be located inside the magnet 20 in the state where the cover member 40 is mounted on the housing 5. Therefore, the present configuration enable to restrict the magnet 20 and the holder 9 from making contact with the IC package 30 (end 501) when the cover member 40 is mounted to the housing 5.

(Second embodiment)

Figure 5:
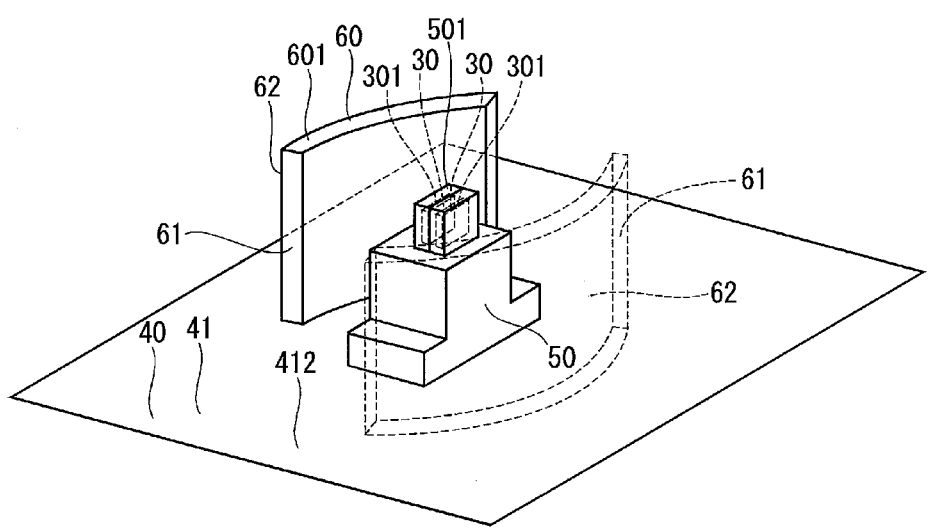
FIG. 5 is a perspective view showing an IC package of a rotary position detection device according to a second embodiment of the present disclosure and a portion around the IC package.

FIG. 5 shows a part of a rotary position detection device according to a second embodiment of the present disclosure. The projection in the second embodiment differs in shape from the projection in the first embodiment.

As shown in FIG. 5, the projection 60 according to the second embodiment includes two notch portions 61, which are different in shape from each other. Therefore, the wall portions are different in size from each other. Thus, according to the present embodiment, the two notch portions 61 are not point symmetric to each other relative to the axis of the projection 60, and the two wall portions 62 are not point symmetric to each other relative to the axis of the projection 60. In the present embodiment, the wall portions 62 of the projection 60 are formed in consideration of those portions, which are supposed to make contact with another component. Thus, the wall portions 62 are formed at further limited positions. In this way, according to the present embodiment, a material, such as resin, used to form the projection 60 can be further reduced, compared with the first embodiment.

(Third embodiment)

Figure 6:
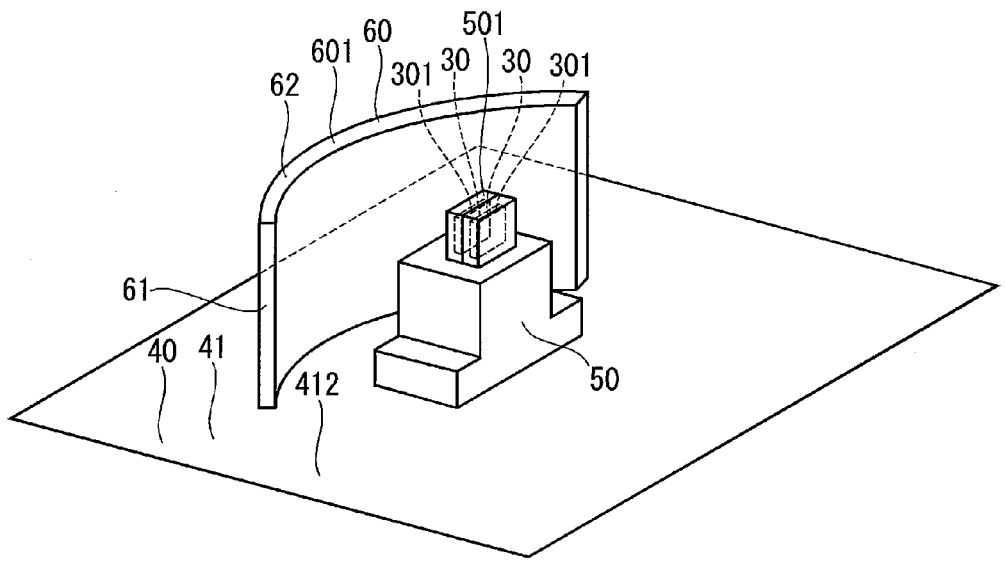
FIG. 6 is a perspective view showing an IC package of a rotary position detection device according to a third embodiment of the present disclosure and a portion around the IC package.

FIG. 6 shows a part of a rotary position detection device according to a third embodiment of the present disclosure. The projection in the third embodiment differs in shape from the projection in the first embodiment.

As shown in FIG. 6, according to the third embodiment, the projection 60 includes only one of the two wall portions 62, which are described in the first embodiment.

In the present embodiment, the wall portion 62 of the projection 60 is formed in consideration of those portions, which are supposed to make contact with another component. Thus, the wall portion 62 is formed at the further limited position. In this way, according to the present embodiment, a material, such as resin, used to form the projection 60 can be further reduced, compared with the first embodiment and the second embodiment.

(Fourth embodiment)

Figure 7:
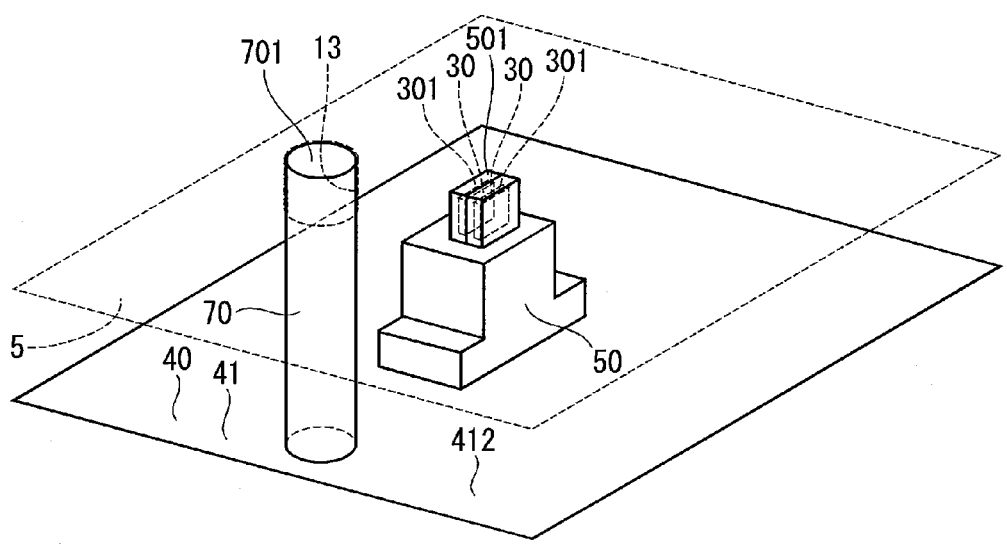
FIG. 7 is a perspective view showing an IC package of a rotary position detection device according to a fourth embodiment of the present disclosure and a portion around the IC package.

FIG. 7 shows a part of a rotary position detection device according to a fourth embodiment of the present disclosure. The projection in the fourth embodiment differs in shape from the projection in the first embodiment.

According to the fourth embodiment, the projection 70 is formed of, for example, resin, integrally with the base portion 412 of the bottom portion 41. The projection 70 is projected from a portion of the base portion 412, which is close to the support portion 50. The projection 70 is projected in a direction same as the direction in which the support portion 50 is projected. The projection 70 is formed in a bar shape. More specifically, the projection 70 is formed in a lengthened columnar shape. The projection 70 is formed separately from the support portion 50.

In addition, according to the present embodiment, the projection 70 has an end (projection end) 701 on the opposite side of the bottom portion 41. The IC package 30 has the end 301 on the opposite side of the bottom portion 41. The end 701 of the projection 70 is located on the opposite side of the end 301 of the IC package 30 from the bottom portion 41. In particular, according to the present embodiment, the end 701 of the projection 70 is located on the opposite side of the end 501 of the support portion 50 from the bottom portion 41.

In addition, according to the present embodiment, the projection 70 has the end 701 on opposite side of the bottom portion 41. The end 701 of the projection 70 is formed such that the end 701 is configured to be fitted to a fitting portion 13, which is formed in the housing 5. The present configuration enables to position the cover member 40 relative to the housing 5 when the cover member 40 is mounted to the housing 5.

Also in the present embodiment, the projection 70 is enabled to protect the IC package 30 (end 501) from breakage due to making contact with an opposed component. In addition, the projection 70 is formed at a limited position at which the device is supposed to make contact with an opposed component. Therefore, according to the present embodiment, a material, such as resin, used to form the projection 70 can be reduced.

(Other embodiments)

According to another embodiment of the present disclosure, the IC package may not be insertion-molded with the support portion. That is, the IC package may be exposed from the support portion at the encapsulation material and/or the like. In addition, the encapsulation material is not limited to be in a rectangular plate shape and may be formed in other various shapes.

In addition, according to another embodiment of the present disclosure, the magnetism detection element is not limited to a hall element and may be another element or another device configured to detect magnetism.

In addition, according to another embodiment of the present disclosure, the IC package may be supported by the support portion such that the IC package is entirely located on the side of the bottom portion of the tubular portion of the cover member relative to the opening of the tubular portion. Even in the present configuration, the projection is enabled to protect the IC package from breakage due to making contact with an opposed component.

According to another embodiment of the present disclosure, the projection has the end located on the opposite side of the bottom portion of the cover member. In addition, the IC package has the end on the opposite side of the bottom portion of the cover member. In addition, the end of the projection may be located on the side of the bottom portion of the cover member relative to the end of the IC package.

According to another embodiment of the present disclosure, the projection may be formed in a tubular shape such that the projection is located on the outside of the magnetic flux emission unit in the state where the cover member is mounted to the housing. In addition, the projection is not limited to be in a tubular shape or in a bar shape. The projection may be in various shapes such as a triangular tubular shape, a square tubular shape, an another polygonal tubular shape, or the like. In addition, the number of the projections is not limited to one or two. The number of the projections may be three or more. The projection may not have a notch portion.

In addition, according to another embodiment of the present disclosure, the rotary position detection device may include a single element of the IC package.

The rotary position detection device according to the present disclosure is not limited to be employed as a valve shaft of a throttle valve. The rotary position detection device may be employed to, for example, detect a rotary position of a rotation axis, such as an accelerator pedal and/or a crankshaft.

According to an example of the present disclosure, the rotary position detection device is configured to detect the rotary position of the detection object, which is rotatably supported by the housing. The rotary position detection device includes the magnetic flux emission unit, the IC package, the cover member, the support portion, and the projection. The magnetic flux emission unit is mounted to the detection object such that the magnetic flux emission unit is rotatable integrally with the detection object. The IC package includes the magnetism detection element. The magnetism detection element is configured to send the signal according to change in the direction of the magnetic flux, which is caused when the magnetic flux emission unit rotates. The cover member includes the bottom portion and the tubular portion. The tubular portion is in a tubular shape and extended from the outer periphery of the bottom portion. The cover member is configured to be mounted to the housing such that the bottom portion on the side of the tubular portion surrounds the magnetic flux emission unit.

The support portion is projected from the bottom portion in the direction toward the opening of the tubular portion. The support portion supports the IC package such that the magnetism detection element is enabled to send the signal. The projection is formed separately from the support portion. The projection is projected in the direction toward the opening. The projection is projected from a portion of the bottom portion around the support portion. The projection is projected at least partially to the position corresponding to the magnetism detection element.

According to the present disclosure, the projection is at least partially located around the IC package. Therefore, when, for example, the cover member is mounted to the housing, the projection is configured to make contact with an opposed component, instead of the IC package. In this way, the configuration of the present disclosure enables to restrict the IC package from making contact with an opposed component. The present configuration enables to protect the IC package from breakage due to making contact with an opposed component.

In particular, an assumed configuration may include the support portion, which supports the IC package, such that the IC package is at least partially located on the opposite side of the opening of the cover member from the bottom portion of the cover member. In the present assumed configuration, the cover member may be placed on a desk or the like such that the opening of the cover member is turned down, when, for example, the cover member is stored or manufactured. In such a state, the configuration of the present disclosure is enabled effectively to protect the IC package from breakage due to making contact with an upper surface of the desk. In addition, the configuration of the present disclosure may enable effectively to protect the IC package from breakage caused by making contact with another component or equipment when, for example, the cover member is conveyed. It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A rotary position detection device configured to detect a rotary position of a detection object, the detection object being rotatably supported by a housing, the rotary position detection device comprising:
    a magnetic flux emission unit mounted on the detection object and configured to rotate integrally with the detection object;
    an IC package including a magnetism detection element, the magnetism detection element configured to send a signal according to change in a direction of a magnetic flux, which is caused when the magnetic flux emission unit rotates;
    a cover member including a bottom portion and a tubular portion, the tubular portion being in a tubular shape and extended from an outer periphery of the bottom portion, the cover member configured to be mounted to the housing to surround the magnetic flux emission unit with the bottom portion on a side of the tubular portion;
    a support portion projected from the bottom portion in a direction toward an opening of the tubular portion, the support portion configured to support the IC package and to enable the magnetism detection element to send the signal; and
    a projection separated from the support portion by a space, the projection projected in a direction toward the opening, the projection projected from a portion of the bottom portion around the support portion to at least a position, which corresponds to the magnetism detection element, wherein
    the projection is spaced from the IC package.

2. The rotary position detection device according to claim 1, wherein
    the IC package is supported by the support portion, and
    the IC package is at least partially located on an opposite side of the opening from the bottom portion.

3. The rotary position detection device according to claim 1, wherein
    the projection has a projection end on an opposite of the bottom portion,
    the IC package has an IC package end on an opposite of the bottom portion, and
    the projection end is located on an opposite side of the IC package end from the bottom portion.

4. The rotary position detection device according to claim 1, wherein the projection is in a tubular shape and surrounds the support portion.

5. The rotary position detection device according to claim 4, wherein the projection is notched partially in a circumferential direction to define at least one notch portion.

6. The rotary position detection device according to claim 5, wherein
    the at least one notch portion includes a plurality of notch portions, and the projection has the plurality of notch portions in the circumferential direction.

7. The rotary position detection device according to claim 4, wherein
the magnetic flux emission unit is in a tubular shape, and
the projection is located inside the magnetic flux emission unit or outside the magnetic flux emission unit in a state where the cover member is mounted to the housing.

8. The rotary position detection device according to claim 1, wherein
the projection has a projection end on an opposite side of the bottom portion, and
the projection end is configured to be fitted to a fitting portion of the housing.

9. The rotary position detection device according to claim 1, wherein
the magnetic flux emission unit is in a tubular shape,
the projection is in a tubular shape to surround the support portion, and
the projection is located inside the magnetic flux emission unit in a state where the cover member is mounted to the housing.

10. The rotary position detection device according to claim 1, wherein
the projection includes two wall portions each having a cross section, which is in an arc shape.

11. The rotary position detection device according to claim 10, wherein
the two wall portions are point-symmetric to each other relative to an axis of the projection.

12. The rotary position detection device according to claim 10, wherein
the projection includes two notch portions each formed by cutting the projection partially in a circumferential direction, and
the two wall portions and the two notch portions are alternately arranged in the circumferential direction.

13. The rotary position detection device according to claim 10, wherein
the two wall portions are different in shape from each other.

14. The rotary position detection device according to claim 1, wherein
the projection includes a singular wall portion having a cross section, which is in an arc shape.

15. The rotary position detection device according to claim 1, wherein
the projection is in a bar shape.

16. The rotary position detection device according to claim 15, wherein
the projection is in a lengthened columnar shape.

17. The rotary position detection device according to claim 16, wherein
the projection has a projection end on an opposite side of the IC package from the bottom portion, and
the projection end is configured to be fitted to a fitting portion of the housing.

* * * * *